May 22, 1945.　　　J. H. SCHULLER　　　2,376,626
AMPHIBIOUS BOAT
Filed March 14, 1944

Inventor
John H. Schuller

By Clarence A. O'Brien
and Harvey B. Jacobson
Attorneys

Patented May 22, 1945

2,376,626

UNITED STATES PATENT OFFICE 2,376,626

AMPHIBIOUS BOAT

John H. Schuller, New Castle, Pa.

Application March 14, 1944, Serial No. 526,395

2 Claims. (Cl. 115—1)

The present invention relates to a convertible conveyance which is, when used in the water, a boat, and when used on land is a vehicle and which, for convenience is described as an amphibious boat, and an outstanding object of the invention is to provide a construction in which powering and power transmission means arranged somewhat amidships is such as to lend itself convertible in a manner to transmit motion to wheels when the structure is on land, and to oppositely arranged twin propellers when the structure is in the water. In one of its embodiments the structure, as a whole, is characterized by an appropriate prime mover or equivalent power plant, this being mounted at a predetermined point in the boat and serving to transmit power through a transmission arrangement to differential type power take-off shafts, these being in appropriate bearings and provided to drive either wheels when the latter are in place, or to drive the twin propellers either one or both.

Another phase of the invention has to do with a boat having propeller devices on opposite exterior sides with means to accommodate detachable ground-engaging wheels, there being a single steering wheel at the back, said steering wheel being included in a unitary structure which also embodies rudders, the completely coordinated structures serving to provide for the aforementioned "amphibious" character of the structure as a whole.

Other features and advantages will become more readily apparent from the following description and the accompanying illustrative drawing.

In the drawing, wherein like numerals are employed to designate like parts throughout the same—

Figure 1:
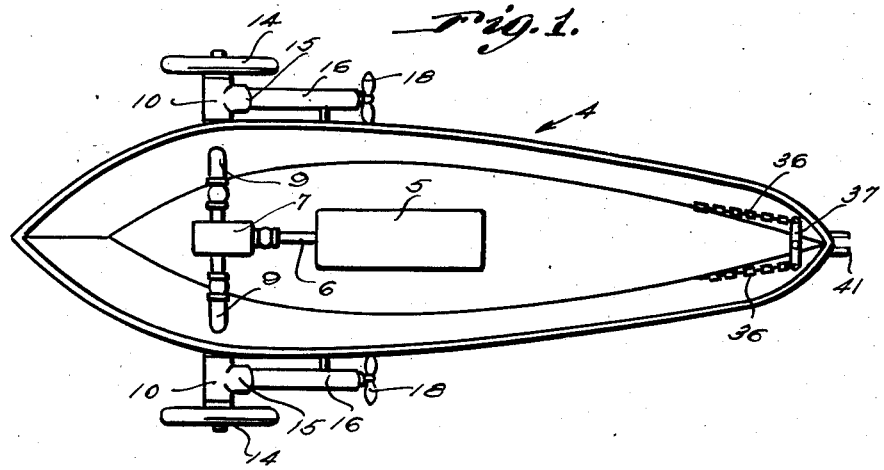
Figure 1 is a top plan view of the convertible type conveyance, this being of the aforementioned amphibious type so that it can be suitably captioned either as a boat or vehicle as the case may be.
Figure 2:
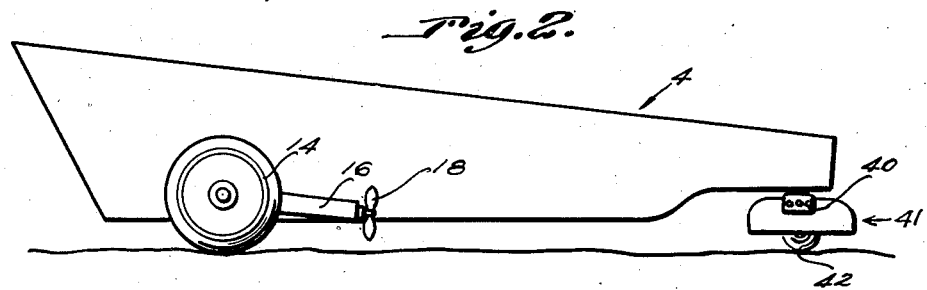
Figure 2 is a side elevational view of the complete structural arrangement depicted in Figure 1.
Figure 3:
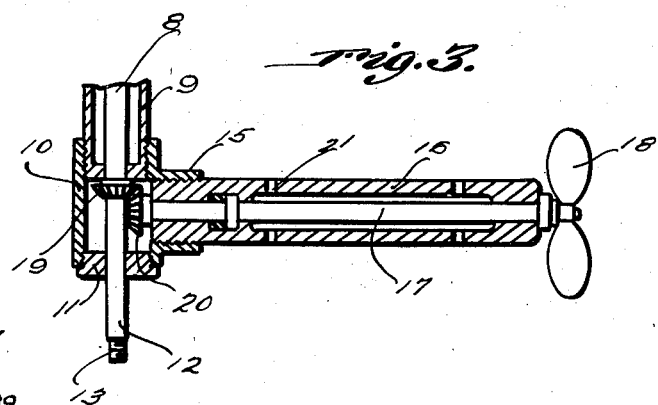
Figure 3 is an enlarged fragmentary detail sectional and elevational view showing the arrangement of bearings and main and auxiliary shafts for the interchangeable and detachable wheels.

Attention is first directed to Figures 1 to 3, inclusive. As before stated we are concerned with what is broadly referred to as an amphibious boat, though the same is in effect a vehicle too. Thus, it is provided with wheels and propellers.

The boat, which may be of any appropriate general construction, is denoted by the numeral 4. Mounted therein, approximately amidships is a suitable power plant or prime mover 5 whose propeller shaft 6 has operating connection, through the medium of an appropriate differential construction 7 with a pair of aligned right angularly disposed power take-off shafts 8. The latter are embodied in appropriate housings 9 mounted in the side walls of the boat at oppositely arranged points. The tubular housings 9 are screwthreaded at their outer ends to accommodate substantially T-shaped adapter couplings 10. One branch of the coupling is threaded on to the housing 9 and the other opposite branch is provided with a removable plug 11 through and beyond which the extended terminal 12 of the power take-off shaft 8 extends. The threaded end 13 accommodates the detachable ground-engaging or traction wheel 14. The remaining or third coupling of the part 10, as indicated at 15, serves to accommodate a bearing sleeve unit 16 having suitable packed bearings at opposite ends to accommodate the right-angularly disposed propeller shaft 17, the latter serving to mount the suitably constructed propeller device 18. The shaft 8 is provided with a beveled or equivalent gear 19 driving an enmeshed gear 20 on the propeller shaft 17. The numerals 21 designate suitable vents or water-holes in the bearing sleeve unit 16.

In this arrangement we have a prime mover in the boat, a differential in operative association therewith, housings extending through the side walls of the boat and accommodating power take-off shafts 8, the latter serving as mounting devices for the detachable wheels 14, and said shafts 8 also serving to transmit motion to the lateral propeller shafts 17. Novelty is thought to reside in this convertible arrangement as well as in the particular structural devices for making the same practicable.

Figure 4:
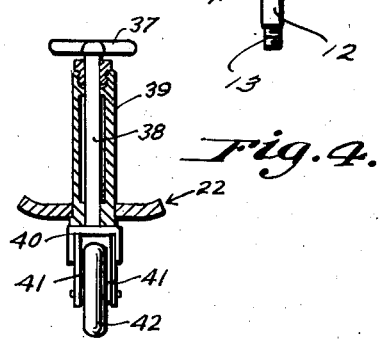
Figure 4 is a sectional and elevational view of the steering means at the rear end of the boat.

The steering means comprises chains or the like 36, (see Figure 1) these being connected to a cross-head 37 (see Figure 4) on the upper end of the shaft 38 mounted in a hollow bearing column or sleeve 39. The latter is appropriately supported in the rear end of the boat and the shaft 38 oscillates therein, said shaft carrying a yoke or fork 40 in its bottom to accommodate the parallel spaced rudders 41 and the wheel 42 journaled on an axle mounted in bearings in said rudder. Thus is provided a unique steering arrangement which is adaptable to use both when the device is employed as a boat and as a land vehicle.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. An amphibious conveyance of the class described, comprising a boat body, a prime mover therein, differential means having operating connection with the prime mover, shaft housings extending on opposite sides of the differential means, power take-off shafts in said housings, wheels removably mounted on the outer ends of said power take-off shafts, a pair of parallel propeller shafts, housings therefor, said housings and propeller shafts being arranged on the exterior opposite sides of the boat body, and operating connections between the propeller shafts and wheel power take-off shafts.

2. In an amphibious convertible type structure, a boat body, a prime mover mounted in said body, a differential, a propulsion shaft connection between the prime mover and differential, axle housings on opposite sides of the differential, power take-off axles and operating connections at their inner ends with said differential having their outer ends extending outwardly beyond the corresponding outer ends of said axle housings, the latter projecting through the side walls of the boat, ground-engaging wheels removably mounted on the outer ends of said axles, T-shaped couplings mounted on the outer ends of said axle housings, a bearing equipped sleeve unit connected to each of said T-shaped couplings and disposed at right angles to the axle housings and arranged on the exterior of the boat, a propeller shaft mounted in each bearing sleeve, the propeller shafts being geared to the aforementioned wheel power take-off axles.

JOHN H. SCHULLER.